United States Patent [19]

Strubbe

[11] 4,259,829
[45] Apr. 7, 1981

[54] COMBINE HARVESTERS

[75] Inventor: Gilbert J. I. Strubbe, Zedelgem, Belgium

[73] Assignee: Sperry Corporation, New Holland, Pa.

[21] Appl. No.: 9,197

[22] Filed: Feb. 5, 1979

[51] Int. Cl.³ .............................................. A01F 12/00
[52] U.S. Cl. .............................. 56/10.2; 56/DIG. 15; 130/24; 130/27 R
[58] Field of Search ................... 56/10.2, DIG. 15; 130/27 HF, 27 R, 24

[56] References Cited

U.S. PATENT DOCUMENTS

| | | | |
|---|---|---|---|
| 3,574,307 | 4/1971 | Theobald | 130/24 |
| 3,593,720 | 7/1971 | Botterill et al. | 56/DIG. 15 |
| 3,606,742 | 9/1971 | Wieneke et al. | 56/10.2 |
| 3,827,442 | 8/1974 | Sholz | 56/DIG. 15 |
| 3,939,846 | 2/1976 | Drozhzhin et al. | 56/10.2 |

FOREIGN PATENT DOCUMENTS 716035 5/1968 Belgium ............................. 56/10.2
1211161 11/1970 United Kingdom ............ 56/10.2

*Primary Examiner*—Jay N. Eskovitz
*Attorney, Agent, or Firm*—James R. Bell; Frank A. Seemar; Larry W. Miller

[57] ABSTRACT

The invention seeks to reduce loss in combine harvesters by monitoring the distribution of crop material over the grain cleaning mechanism and taking corrective action when the distribution is unfavorable such as by adjusting one or more components of the combine which affect said crop distribution.

In one embodiment, temperature-sensitive devices are provided on the louvres of the chaffer sieve of the grain cleaning mechanism and the output signals of the devices are applied to a control circuit which produces a command signal which can be used to control the speed of a fan of the cleaning mechanism or to adjust the position of baffles in the fan outlet duct.

28 Claims, 9 Drawing Figures

COMBINE HARVESTERS

BACKGROUND OF THE INVENTION

Field of the Invention

This invention relates to combine harvesters of the conventional type and of the so-called rotary type such as an axial flow combine harvester.

As is well known, combine harvesters normally have a header with a cutter for cutting standing crop, the cut crop being conveyed by an elevator to a threshing mechanism comprising a concave through which threshed crop material falls to a grain pan. The straw issuing from the threshing mechanism passes to another device which assists in the further separation from the straw of any grain entrained in the latter, this crop material also being guided to the grain pan. The crop material received on the grain pan is transferred to a grain cleaning mechanism which comprises an upper chaffer sieve, a lower sieve and a fan operative to blow air through the two sieves from below so as to render airborne chaff and dust, for example, which is then discharged from the rear of the machine leaving the grain in a clean condition. The sieves are reciprocated and clean grain falls therethrough to a grain trough and from there is transferred to a grain tank. Any unthreshed crop (known as "tailings") mixed with the crop material on the sieves is too large to pass therethrough and is progressively moved rearwardly of the machine until it falls from the ends of the sieves to a tailings trough from where the tailings are conveyed to the threshing mechanism, or to a separate tailings thresher, for rethreshing.

Reference will be made throughout this specification to "grain", "straw" and "crop material" and it is to be understood that "grain" covers the seed or kernel, "straw" covers the discardable part of the particular crop being harvested, and "crop material" covers a mixture of grain, straw particles and chaff.

DESCRIPTION OF THE PRIOR ART

A combine harvester has a number of critical areas, one of which is the grain cleaning mechanism in connection with which a number of problems can arise. Sieve loss can occur by which is meant that grain intended to pass through the sieves may be prevented from doing so because the sieves are blocked by weeds, tailings or other foreign matter, because the sieves are overloaded, or because the sieves are not properly adjusted, for example. In each of these cases, grain is moved over the sieves by the reciprocation thereof and falls to the tailings trough. This results in the grain being subjected to the harsh action of the threshing mechanism with the likely result that it will be cracked and hence rendered valueless. Furthermore, this increases unnecessarily the load on the threshing mechanism which may result in additional losses. Another factor affecting sieve loss is the speed of the fan forming part of the cleaning mechanism. If the velocity of the air blown through the sieves is too high, grain becomes airborne as well as the chaff and dust and is thus discharged from the machine and lost. On the other hand, if the velocity of the air is too low, dust and chaff may fall through the sieves with the grain, giving a poor grain sample and/or may remain on the sieves giving rise to sieve overload.

The distribution of the threshed crop material on the sieves of the cleaning mechanism is also an important factor because if the distribution is uneven as seen in the transverse direction of the sieves, then both grain loss and a poor grain sample (by overload in the heavily loaded areas and by grain being blown out of the machine from the lightly loaded areas, respectively) may result. Uneven distribution transversely of the sieves may be due to the operation of the machine on sloping ground, due to poor distribution of threshed crop material on the grain pan due to irregular feeding of the crop material from the header to the threshing mechanism, or due to an irregular transverse pattern of the airstream issuing from the fan of the cleaning mechanism, for example. As seen in the longitudinal direction of the sieves, the loading of the threshed crop material ideally should decrease from a maximum to a minimum from front to rear, with only tailings passing over the rear end of the sieves. Overloading at the rear end of the sieves normally results in increased grain loss and additional loading on the tailings return mechanism and the threshing mechanism or separate tailings thresher. Under-loading of the rear end of the sieves normally means that either the full capacity of the sieves is not being realised or that a poor grain sample is being obtained. Improper distribution of threshed crop material longitudinally of the sieves is also undesirable and may result from the operation of the machine on sloping ground, from an improper longitudinal pattern of the airstream issuing from the cleaning fan, from a blockage occurring at the rear of the cleaning mechanism, or from a varying forward speed and/or varying material intake of the machine.

It is known to provide adjustable baffles in the outlet duct of the cleaning fan so that some adjustment of the transverse and longitudinal airstream patterns may be effected and it is also known to provide for variation in the fan speed. However, these adjustments normally have to be effected by the machine operator at locations other than his driving cab or platform which means that the machine has to be stopped with valuable harvesting time being lost. Furthermore, the operator can only make an adjustment when he knows the problem with which he is faced and this is very often extremely difficult to adduce.

SUMMARY OF THE INVENTION

It is a principle object of the present invention to provide a combine harvester in which there is improved control over the operation of the grain cleaning mechanism.

According to the present invention a combine harvester comprises a threshing mechanism to which, in use, cut crop material is fed, a grain cleaning mechanism including a grain sieve disposed to receive grain from the threshing mechanism, sensing means operable to sense crop material distribution in the cleaning mechanism and to produce an electrical output signal or signals indicative thereof, and utilisation means responsive to the output signal or signals.

By "crop material distribution" is meant not only the relative disposition of crop material across or along the cleaning mechanism but also the thickness of the bed of crop material, which may be evenly distributed, and the weight distribution of the crop material. Even with an evenly distributed bed of crop material, the grain may be located in one or more discrete areas relative to the straw or chaff so that the weight distribution will be uneven and can be detected.

The sensing means may be associated with the grain sieve in order to sense crop material distribution thereon. The cleaning mechanism may include a grain pan located so as to receive threshed crop material from the threshing mechanism and to pass the same to the grain sieve, and the sensing means may be associated with the grain pan.

The utilisation means may merely monitor the grain distribution and comprise an audio and/or visual warning actuatable when the distribution is unfavourable, or the utilisation means may effect adjustment of one or more components of the combine harvester to achieve an optimum crop material distribution.

The grain sieve of the cleaning mechanism may comprise an upper chaffer sieve with louvres through which air is blown by a fan to remove chaff and dust, for example, from the grain in the conventional manner and the sensing means, when associated with the sieve, may be such as to detect the gradient of the airstream transversely and/or longitudinally of the upper sieve which will be indicative of the gradient or distribution of the crop material on the sieve. Different types of sensing means may be employed to this end, for example the sensing means may comprise thermistors, hot-wire devices, air pressure sensors, directional vanes or mass detection devices.

Grain distribution may be detected by investigating the build-up of crop material on the grain pan and/or upper sieve other than by sensing the airstream gradient and in this case, the sensing means may comprise photoelectric devices, mass detection devices, optical reflectance devices or capacitive, inductive or piezo-electric devices. It may be desired to look more specifically at the build-up of crop material at the louvre apertures of the upper sieve and to achieve this, the sensing means may comprise a device which measures the electrical resistance between adjacent louvres across the aperture therebetween, which resistance will vary with the amount of crop material present in the aperture. Alternatively, a photo-electric device may be employed.

Thus the sensing means may be any known detecting device positioned on, under, above, in front of, or behind the upper sieve, for example, for translating a physical or related characteristic indicative of crop material distribution into an electrical signal. Sensing means positioned forwardly of the sieve may detect a tendency towards an unfavourable crop material distribution on the sieves before it actually occurs and be used to operate a warning device and/or effect corrective action. Sensing means positioned rearwardly of the sieve will detect an unfavourable crop material distribution when it has occurred, whereby grain loss is likely to have taken place before corrective action can be taken. Accordingly, it is preferable to locate the sensing means other than at the rear of the sieve although even the latter location will give rise to quicker corrective action than will occur in the absence of the present invention. In fact, a favourable location for the sensing means is in a row across the sieve at about two thirds along its length from the front. Other rows of sensing means may be employed forwardly and/or rearwardly of this one row.

The sensing means may be used to control one or more components of the combine harvester, depending on the nature of the crop material distribution detected. For example, the speed of the fan may be adjusted; the position of baffles in the outlet of the fan may be varied to provide transverse and/or longitudinal regulation of the airstream through the upper sieve; the position of deflector plates associated with the grain pan of the combine harvester may be adjusted to change the pattern of crop material flow to the upper sieve; the ground speed of the combine harvester can be varied to regulate the crop intake; the rotational speed of the threshing mechanism of the combine harvester may be adjusted and/or the rotational speed of any separating mechanism; the setting of a concave forming part of the threshing mechanism and/or separating mechanism may be adjusted; deflectors provided at the concaves may be adjusted; and the inclination to the horizontal of the upper sieve or portions thereof may be varied.

In a preferred embodiment of the invention, the sensing means is used to detect the airstream gradient at the upper sieve and the sensing means comprise a plurality of thermistors located on the underside of a louvre of the sieve and spaced transversely of the sieve. The thermistors may be arranged in one or more rows across the upper sieve and have their outputs connected to monitoring means and/or to means for controlling one or more of the above-mentioned components of the combine harvester. The monitoring means may comprise an audible warning device, such as a horn, and a visual indicator showing which areas of the upper sieve have a less than ideal grain loading. The controlling means may be an electric motor for adjusting baffles or deflectors, or a belt variator, for example.

If more than one row of thermistors, or other sensing devices, are employed, means may be provided for obtaining more sophisticated data concerning crop material distribution. The mean of the outputs of each row may, for example, be determined and then combined with the mean of one or more other rows and a command output signal obtained if a predetermined threshold is exceeded, the command signal being used to control baffles in the fan inlet area, the fan housing and the fan outlet duct, and/or the fan speed to vary the airstream longitudinally of the upper sieve. Alternatively, or in addition, the ratio of the outputs of the sensing devices at different locations (right-hand side, centre, left-hand side) of the upper sieve to the mean of the outputs of the devices in the one and the same row can be determined and used to detect variation in crop material distribution transversely of the sieve, again a command signal being produced if a predetermined threshold is exceeded, the command signal controlling other baffles in the fan outlet duct to vary the airstream transversely of the sieve.

It will be appreciated that the present invention may be used to control crop material distribution over the sieve of the grain cleaning mechanism, so as to avoid partial or total sieve overload, without requiring the operator to pay attention to the cleaning mechanism with a view to adjusting, and possibly stopping, the machine. The invention is particularly suited to rotary combines such as an axial flow combine harvester in which a plurality of longitudinally-extending threshing and separating mechanisms are disposed side-by-side transversely of the machine. This construction of the axial flow combine tends to give rise to uneven crop material distribution on the grain pan, and hence grain sieve, since crop material issues from the separate, transversely-spaced threshing and separating mechanisms. Such an axial flow combine harvester tends to produce more short pieces of straw in relation to other combine harvesters and this straw has to be separated from the grain in the cleaning mechanism. This gives rise to a greater risk of the sieves of the cleaning mechanism becoming overloaded, whereby the present invention is especially advantageous.

BRIEF DESCRIPTION OF THE DRAWINGS

A combine harvester in accordance with the present invention will now be described in greater detail, by way of example, with reference to the accompanying drawings, in which.

DETAILED DESCRIPTION OF THE PREFERRED EMBODIMENT

Figure 1:
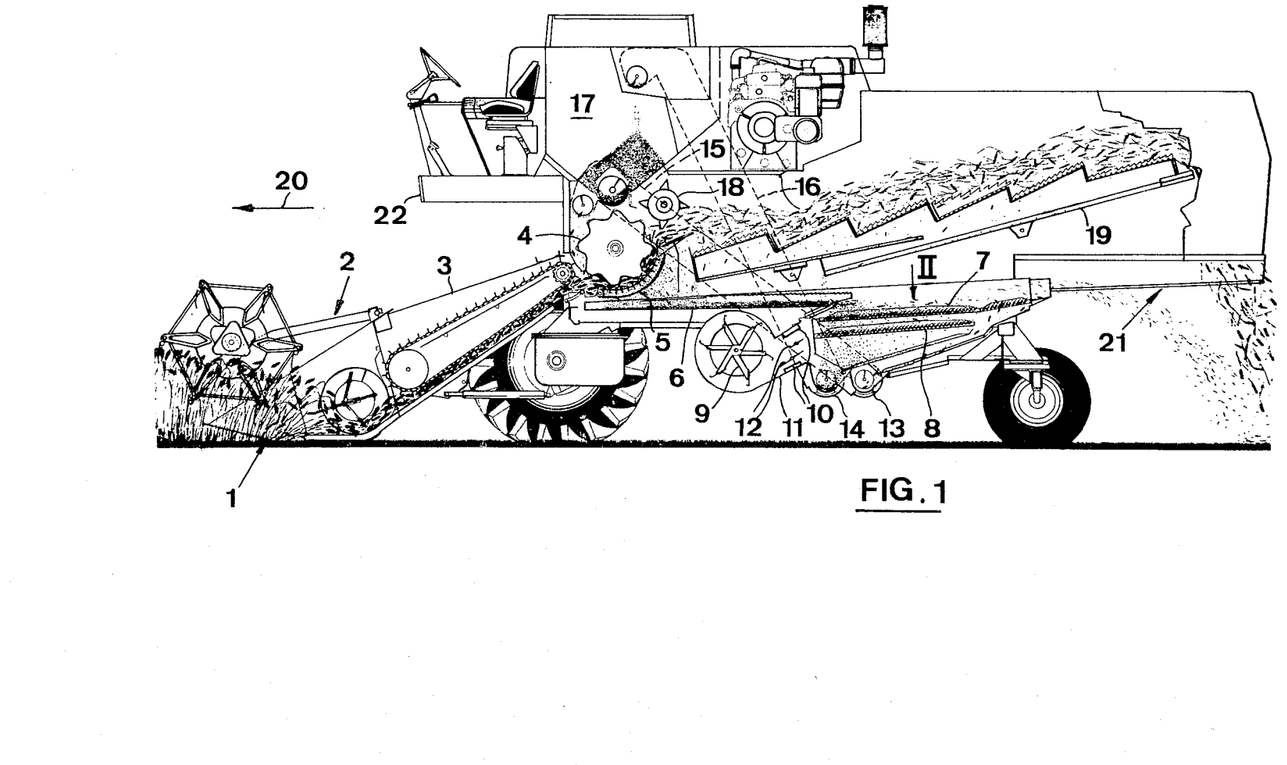
FIG. 1 is a side elevation of the combine harvester with certain parts removed to show the main components.

FIG. 1 shows a conventional combine harvester in which the present invention has been incorporated, the machine comprising a cutterbar 1, a header 2, a crop elevator 3 and a threshing mechanism to which the elevator feeds cut crop, the threshing mechanism having a cylinder 4 and concave 5. Beneath the threshing mechanism there is located a cleaning mechanism comprising a grain pan 6, an upper chaffer sieve 7, a lower sieve 8 and a fan 9 provided with an outlet duct 11 in which are mounted pairs of adjustable baffles 10 and 12 operable to direct the stream of air issuing from the outlet 11 in any desired pattern along and across the sieves. The usual tailings trough 13 and clean grain trough 14 are positioned below the sieves 7 and 8 with respective augers therein and connected by associated conveyors 15 and 16 to the threshing mechanism and a grain tank 17, respectively. A beater 18 is operable on the threshed crop material issuing from the threshing mechanism to assist the passage thereof to conventional straw-walkers 19 which separate any grain remaining in the crop material, which grain falls through the straw-walkers and is directed to the grain pan 6. The straw issuing from the straw-walkers 19 is discharged to the ground through a rear discharge opening 21, as is chaff, dust etc. blown from the sieve 7. An operator's platform 22 is located immediately in front of the grain tank 17, above the crop elevator 3.

Turning now to FIGS. 2 to 6, both the sieves 7 and 8 are inclined upwardly from front to rear of the machine, the direction of forward, operative travel of the machine being indicated in FIG. 1 by arrow 20. Furthermore, both the sieves 7 and 8 are, in use, reciprocated from front to rear in order to move crop material received thereon from the grain pan 6 gradually rearwardly of the machine, clean grain continually falling through the sieves to the clean grain trough 14 in the process. The "mesh" of each of the sieves 7 and 8 is provided by a plurality of transverse louvres 23 each stamped out of sheet metal and having a main body portion 24, rearwardly-extending fingers 25 and a forwardly-extending portion 26 which is angled downwardly with respect to the main body portion 24. The louvres 23 are juxtaposed such that the fingers 25 of one overlie the body portion 24 and rear portion 26 of the next louvre, hence forming a "mesh" through which clean grain may fall.

Figure 2:
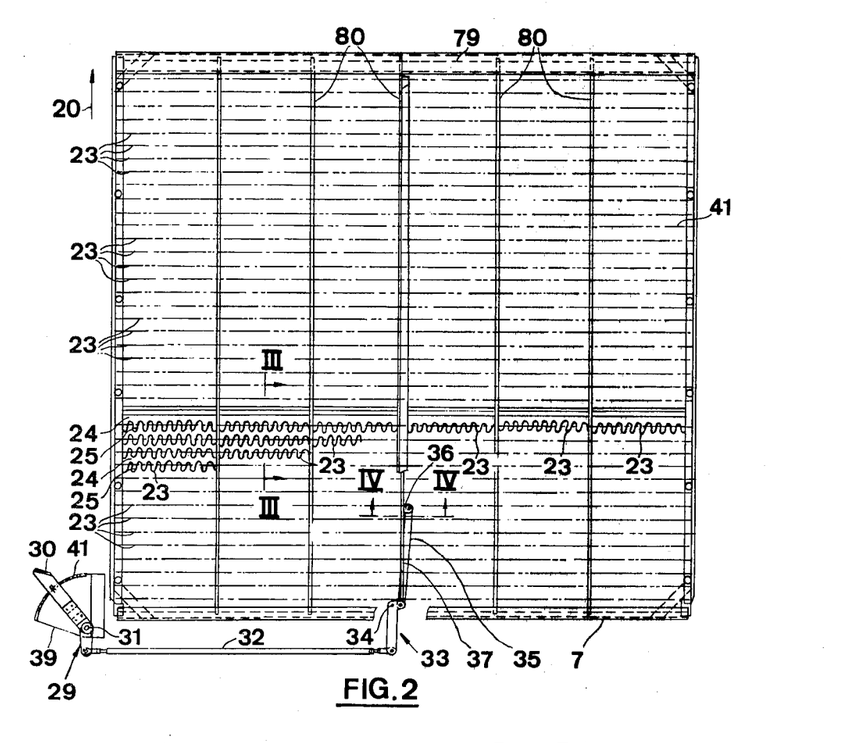
FIG. 2 is a plan view in the direction of arrow II of FIG. 1 of an upper chaffer sieve with adjustable louvres of a grain cleaning mechanism of the combine harvester.
Figure 3:
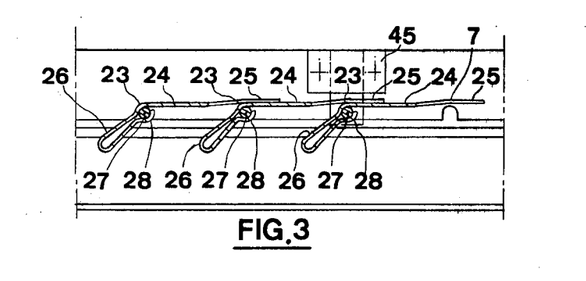
FIG. 3 is a section on line III—III of FIG. 2.
Figure 4:
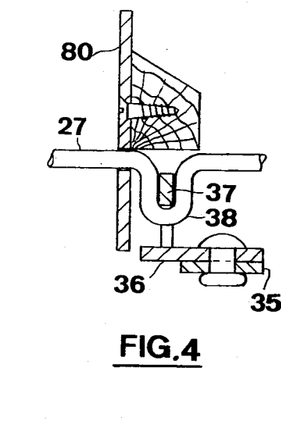
FIG. 4 is a section on line IV—IV of FIG. 2.

The louvres 23 of sieve 7 (and possibly of sieve 8 also) are angularly adjstable and for this purpose are mounted on pivot rods or shafts 27 secured in housings 28 formed integrally of the louvres. Each louvre 23 is formed in six sections, as seen more clearly in FIG. 2, but has a common rod 27 extending therethrough, rotation of which varies the angle of the louvre. Rotation of the rods 27 is effected by a linkage mechanism comprising a handle 30 forming one half of a bell-crank lever 29 pivoted at 31 and having the other half pivotally attached to one end of a rod 32. The other end of the rod 32 is pivotally attached to one end of another bell-crank lever 33 pivoted at 34 and pivotally attached at the other end to one end of a link 35. The other end of the link 35 is pivotally attached to a lug 36 connected to a flat rod 37 extending the length of the sieve and being connected to each louvre rod 27 at a U-shaped portion 38 (FIG. 4) formed therein. The bell-crank lever 29 is mounted on a bracket 39 attached to one side of the combine harvester and having a notched portion 41 for reception of the handle 30 in a selected position. Manual adjustment of the handle 30 from one notch to another rotates the bell-crank lever 29 and assuming movement of the handle to the right as seen in FIG. 2, this moves the rod 32 to the left, the bell-crank lever 33 clockwise, the link 35 downwardly and hence the rod 37 downwardly which rotates the louvre rods 27 and decreases the sieve "mesh". The louvres are mounted in a frame 79 having longitudinally-extending reinforcing struts 80.

Figure 5:
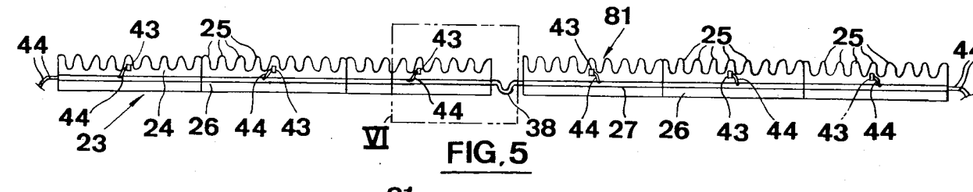
FIG. 5 is an underside plan view, to a larger scale, of one louvre of the sieve of FIG. 2.
Figure 6:
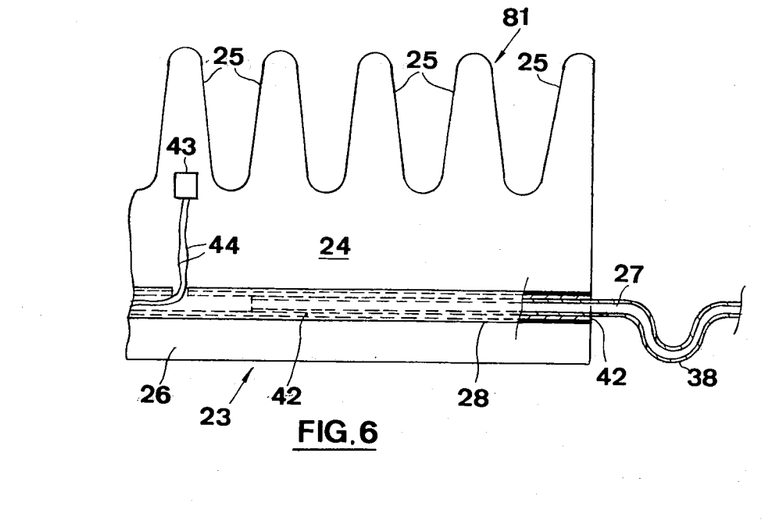
FIG. 6 is an enlarged view, partly in section, of portion VI of FIG. 5.

The sieve description so far may apply to both the sieves 7 and 8 (although the lower sieve 8 may comprise a sheet of perforated material with a fixed "mesh") but now the description applies only to the sieve 7 and reference will be made to FIGS. 5 and 6 which shows a special louvre 81 adapted in accordance with a feature of the present invention and located approximately two thirds along the sieve from the front. The general construction of the louvre 81 is the same as that of the louvres 23 except that the rod 27 does not extend the full length thereof but extends only a short distance to either side of the U-shaped portion 38 as seen in FIG. 6. The shortened rod 27 extends into, and is secured to, a tube 42 secured with the housing 28, the tube being interrupted at the U-shaped rod portion 38. At the centre of each of the six sections of the louvre 81 there is mounted, on the underside of the body portion 24, an electrical, temperature-sensitive device 43 (such as a thermistor), leads 44 for energising the device and taking the signal therefrom being taken through the housing 28 and the wall of the tube 42 and then along the bore of the latter to one side or the other of the sieve, and then to associated control circuitry to be described. Being positioned on the underside of the louvre body portion 24, the temperature-sensitive devices 43 are protected from any direct contact with the crop material on, or passing through, the sieve which could be damaging. Nevertheless, the devices 43 are exposed to the airstream issuing from the fan 9 of the cleaning mechanism, whereby they are cooled to a greater or lesser extent, depending on the amount of crop material on the sieve 7 serving to block the passage of air therethrough.

Thus the temperature-sensitive devices 43 provide electrical signals representative of the crop material distribution on the sieve 7 at six equi-spaced points there-across. If desired, two or more of the special louvres 81 may be provided spaced longitudinally of the sieve 7 as to provide an indication of the crop material distribution along, as well as across, the sieve. The special louvres 81 are easily applied as retrofits to existing sieves, the only modification required being the cutting of the frame sides and longitudinal struts 80 in order to remove the existing louvres and fit the new ones, the resulting gaps being bridged by plates 45 (FIG. 3) to retain the louvres 81.

Figure 7:
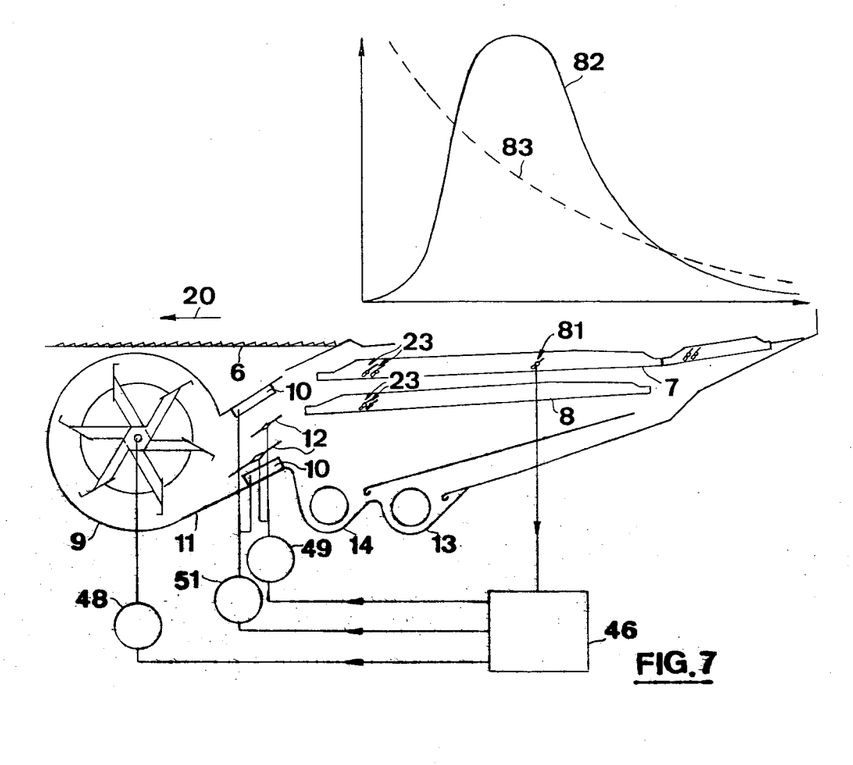
FIG. 7 is a view to an enlarged scale, of part of FIG. 1 with a juxtaposed explanatory graph and showing, in block form, some associated control circuitry.

Turning now to FIG. 7, this shows, to an enlarged scale, the cleaning mechanism of the combine harvester with control circuitry 46, illustrated diagrammatically, connected to the temperature-sensitive devices 43 on a single special louvre 81. Above the sieve is shown a graph illustrating the grain penetration 82 and wind velocity 83 as seen along the sieve 7 in ideal operating conditions. The speed of the fan 9 is controlled by an infinitely variable belt variator (not shown) as is conventional, the adjustable baffles 10 are set initially to provide a desired air or wind pattern transversely of the sieves 7 and 8, and the adjustable baffles 12 set to give a selected wind pattern longitudinally of the sieves. As seen in the graph, the majority of clean grain falls through the sieve 7 over the first two thirds of its length, peaking at about mid-way, whilst the wind velocity through the sieve decreases from front to rear, although not linearly. Thus the distribution of the crop material on the sieve 7, in terms of the thickness of the mat thereof, is such as to reduce at the two thirds point at which the special louvre 81 is located.

It will be appreciated that if the mat thickness at this point is more than in the ideal situation, then less air will flow through the sieve 7, whereby the temperature of the temperature-sensitive devices will increase which will be reflected in the output signals from the devices which are fed to the control circuit 46. A main factor affecting the thickness of the mat of crop material on the sieve 7 is the speed of the fan 9 and if the mat is too thick, then the control circuitry may energise a motor 48 to effect adjustment of the belt variator to increase the speed of the fan 9. If the mat of crop material is unduly thin at the louvre 81 this may mean that the fan speed is too high or that the full capacity of the machine is not being realised. In either event, a power saving can be made by decreasing fan speed, again using the motor 48 when the signals indicating a decrease in temperature of the devices 43 (increase in wind velocity relative to the ideal condition) are received by the control circuit 46. Also, and more importantly, reduction of the fan speed, when the latter is too high, will result in a reduction in grain losses. When the full capacity of the machine is not attained, the forward speed of the machine may be increased. Another factor affecting the longitudinal wind pattern through the sieve 7 is the adjustment of the baffles 12 and a motor 49 is provided for this adjustment, the motor being energised in the appropriate direction by the control circuit 46 and used to adjust the baffles either individually or together.

The temperature-sensitive devices 43 may be looked at individually or collectively by the control circuit 46 and in the former case, an indication will be given of any change in temperature (and hence crop material distribution) across the sieve 7. Ideally, the temperature should be substantially the same across the sieve, any expected differences at the extreme sides being allowed for in the initial calibration of the temperature-sensitive devices 43. Therefore, any discrepancy in temperature across the sieve indicated by the devices 43 will mean that the transverse distribution of the crop material is not favourable, and this can be corrected by energising a motor 51 to adjust the position of the baffles 10, either individually or together.

It will be seen that the temperature-sensitive devices 43 can be used to instigate the adjustment of various components of the combine harvester to correct for any unfavourable distribution of crop material on the sieve 7, thereby avoiding inefficient operation of the cleaning mechanism to the point where it may be totally overloaded. The control circuit 46 may also energise a warning device on the operator's platform when the sensed temperature rises above a preselected value and may also operate a display showing the temperature across the sieve 7.

Figure 8:
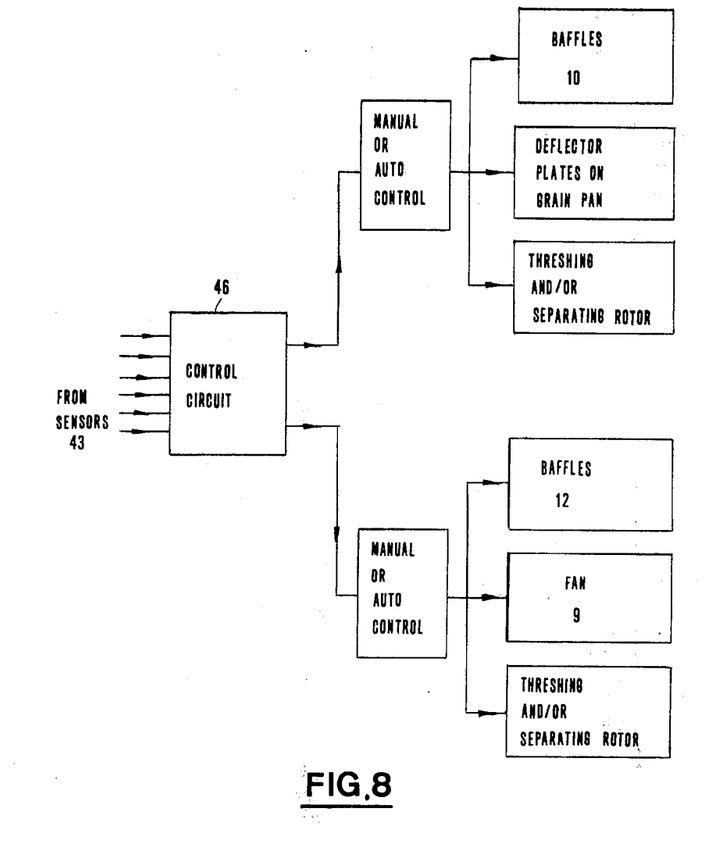
FIGS. 8 and 9 are block diagrams, respectively, of alternative control circuitry.

As discussed hereinabove, there are components other than those of the cleaning mechanism which may be adjusted instead, or in addition, to achieve an optimum loading of the sieve 7. For example, the distribution of crop material on the grain pan 6 is all-important since the crop material is fed from the grain pan directly to the sieve 7. Accordingly deflector plates (not shown) may be provided which are adjustable so as to spread crop material issuing from the concave 5 evenly over the grain pan. Looking further back into the operation cycle of the combine harvester, the threshing mechanism can affect the loading of the cleaning mechanism and adjustment of the rotational speed of the cylinder 4 may be made to effect some control. If the invention is applied to a rotary combine harvester in which an additional rotary separating device is provided, the speed of a rotor of the latter may also be adjusted. The choice of component adjustment varies according to the nature of the crop material distribution problem and FIG. 8 shows diagrammatically some of the adjustments which may be made, either manually or automatically, following an indication from the temperature-sensitive devices 43 and control circuit 46 that irregular transverse crop distribution is present on the sieve 7 (upper half of FIG. 8) and/or that the sieve 7 is generally overloaded (lower half of FIG. 8).

As already mentioned, more than one special louvre 81 may be employed and FIG. 9 shows, again diagrammatically, the nature of the control circuitry associated with the employment of three louvres 81 spaced longitudinally of the sieve 7, and used to control only the wind pattern through the sieve 7. The output signals from the eighteen temperature-sensitive devices 43 (six such devices mounted on each of the three louvres 81), represented as block 52, are fed to circuitry 53 which effects several different calculations on the inputs to derive output signals on lines 54 to 58. The output signal on line 54 represents the mean temperature as seen by the first row of temperature-sensitive devices, i.e. those on the louvre 81 positioned towards the front of the sieve 7. The output signals on lines 55 and 56 represent the mean temperatures as seen by the middle and rear rows of temperature-sensitive devices, respectively. The ratio of the signals from the two right-hand temperature devices 43 to those from the centre devices of the three rows (either individually or collectively) is provided on line 57 and the ratio of left-hand to centre signals on line 58.

Figure 9:
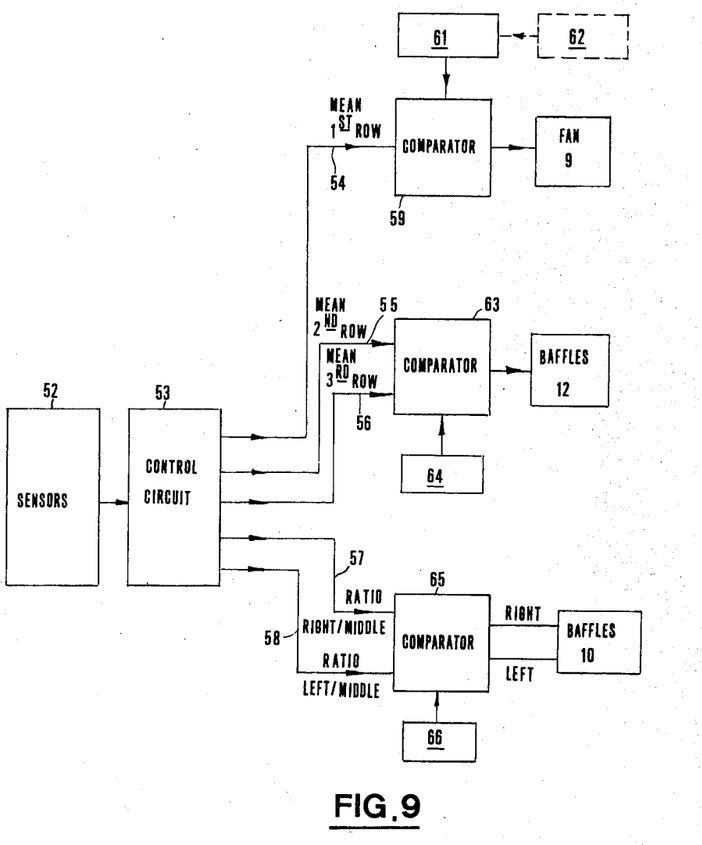

The signal on line 54 provides one input to a comparator 59, another input thereto being provided by a device 61 which is adjustable to give a predetermined mean temperature signal for the front row of temperature-sensitive devices. The value of this signal may be set at the fractory or by a dealer, for example, with knowledge of local conditions which dictate an adjustment. Any disparity between the predetermined and actual signals produces an output signal from the comparator 59 which is used to adjust the speed of the fan in the cleaning mechanism such as by the motor 48 of FIG. 7. In as much as the condition of the crop may vary during a period of operation, the device 61 may be adjustable in use by some device representative of the loading of the machine, for example, as illustrated by block 62.

The signals on lines 55 and 56 provide two inputs to a further comparator 63, a third input thereto being provided by an adjustable device 64 representing the expected decrease in wind velocity through the sieve 7 at the middle and rear louvres 41. Any disparity between this predetermined value and the value derived from the signals on lines 55 and 56 produces an output signal from the comparator 63 which is used to adjust the baffles 12. It will be appreciated that the signals on lines 57 and 58 represent the crop material distribution transversely of the sieve 7 and these signals form two inputs to a still further comparator 65, a third input being provided by an adjustable device 66 giving a signal representative of the expected temperature deviation transversely of the sieve 7. Any disparity between the signal from the device 66 and that derived from the signals on lines 57 and 58 produces an output signal from the comparator 65 which is used to adjust the baffles 10 and/or the deflector plates associated with the grain pan 6 if such are provided.

As mentioned hereinbefore, the sensing of the crop material distribution may be effected other than by temperature-sensitive devices and the latter are not employed if the sensing means are associated with the grain pan 6. In this case, sensing means in the form of photo-electric devices, mass-detection devices, optical reflectance devices, or capacitive, inductive or piezoelectric devices, for example, may be used.

It will be seen that the present invention provides monitoring of the crop material distribution in, and hence loading of, the cleaning mechanism of a combine harvester which improves the efficiency thereof not only in terms of achieving a maximum grain yield but also in terms of operating time. That is to say, maximum grain yield can be achieved without the necessity for time-consuming manual adjustments of the combine harvester components.

Having thus described the invention, what is claimed is:

1. A combine harvester comprising:
   a wheel supported chassis operable in use to be moved across a field with crops;
   harvesting means on the chassis for harvesting crops;
   threshing and separating means operable to receive harvested crops from the harvesting means and to separate crop material therefrom;
   a cleaning sieve, disposed to receive thereon crop material from the threshing and separating means and having a plurality of openings therein for the passage therethrough in a first direction of cleaned grain separated from the crop material on the sieve;
   fan means operable to blow a cleaning air stream in an opposing second direction through said openings in said sieve;
   sensing means operable to sense crop material distribution on the cleaning sieve and to produce an output signal indicative thereof;
   utilization means responsive to the output signal; and
   a grain pan disposed to receive crop material from the threshing and separating means and to feed said crop material to the cleaning sieve and deflector means adjustably associated with the grain pan, the utilization means of said combine harvester also comprising control means coupled to said deflector means and operable to control the position of said deflector means so as to vary the pattern of crop material flow from the grain pan to the cleaning sieve in response to the crop material distribution on said sieve.

2. A combine harvester comprising:
   a wheel supported chassis operable in use to be moved across a field with crops;
   harvesting means on the chassis for harvesting crops;
   threshing and separating means operable to receive harvested crops from the harvesting means and to separate crop material therefrom;
   a cleaning sieve, disposed to receive thereon crop material from the threshing and separating means and having a plurality of openings therein for the passage therethrough in a first direction of cleaned grain separated from the crop material on the sieve;
   fan means operable to blow a cleaning air stream in an opposing second direction through said openings in said sieve;
   sensing means operable to sense crop material distribution on the cleaning sieve and to produce an output signal indicative thereof;
   utilization means responsive to the output signal; and
   deflector means operatively associated with the threshing and separating means, and the utilization means of said combine harvester also comprising control means coupled to said deflector means and operable to control the position of said deflector means so as to vary the pattern of crop material flow from the threshing and separating means to the cleaning sieve in response to the crop material distribution on said sieve.

3. A combine harvester comprising:
   a wheel supported chassis operable in use to be moved across a field with crops;
   harvesting means on the chassis for harvesting crops;
   threshing and separating means operable to receive harvested crops from the harvesting means and to separate crop material therefrom;
   a cleaning sieve, disposed to receive thereon crop material from the threshing and separating means and having a plurality of openings therein for the passage therethrough in a first direction of cleaned grain separated from the crop material on the sieve;
   fan means operable to blow a cleaning air stream in an opposing second direction through said openings in said sieve;
   sensing means operable to sense crop material distribution on the cleaning sieve and to produce an output signal indicative thereof;
   utilization means responsive to the output signal; and the utilization means comprise position control means operatively coupled to at least a portion of the cleaning sieve to adjust the inclination thereof to the horizontal responsive to the crop material distribution on said sieve.

4. A combine harvester according to claim 3 wherein the sensing means comprise at least two spaced apart sensors; the combine harvester further also comprising a first circuitry coupled to said sensors and operable to produce a mean signal, and a comparator circuitry coupled to the first circuitry and adapted to compare the mean signal with a predetermined desired signal and to produce the output signal when there is a disparity between the mean signal and the desired signal.

5. A combine harvester according to claim 3 wherein the sensing means comprise a plurality of sensors provided in at least two rows transversely of the cleaning sieve, the combine harvester further also comprising a first circuitry coupled to said sensors and operable to produce a mean signal for each row of sensors, and a comparator circuitry operable to compare the mean signals and to produce the output signal when the disparity between said mean signals exceeds a predetermined threshold.

6. A combine harvester according to claim 3 wherein the sensing means comprise a plurality of sensors provided transversely of the width of the cleaning sieve, the combine harvester further also comprising a first circuitry coupled to the sensors and operable to produce a mean signal and a comparator circuitry operable to determine the ratio of the signals from sensors at different locations to the mean signal to detect variation in the crop material distribution transversely of the cleaning sieve and also operable to produce the output signal if a predetermined threshold is exceeded.

7. A combine harvester according to claim 3 comprising a control circuit to which are applied the output signals of the sensing means and which produce at least one mean signal; at least one threshold device and at least one comparator circuit to which are applied the signals from the control circuit and from the threshold device; the control circuit being operable to derive therefrom the output signal.

8. A combine harvester comprising:
harvesting means for, in use, harvesting crops;
threshing and separating means operable to receive harvested crops from the harvesting means and to separate crop material therefrom;
cleaning means disposed to receive crop material from the threshing and separating means and to separate clean grain therefrom;
sensing means associated with the cleaning means and operable to sense crop material distribution in the cleaning means and to produce an output signal indicative thereof;
utilization means responsive to the output signal;
the cleaning means further comprises a cleaning sieve with a plurality of cooperating louvres and a fan means operable to blow a cleaning air stream through adjacent louvres of said cleaning sieve, and wherein sensing means are disposed longitudinally of the length of the cleaning sieve and are operable to detect the gradient of the air stream longitudinally of the sieve which is indicative of the longitudinal crop material distribution on the sieve; and
the sensing means comprise a plurality of air pressure sensors operable to sense the pressures in the air stream which are indicative for the crop material distribution on the sieve.

9. A combine harvester comprising:
harvesting means for, in use, harvesting crops,
threshing and separating means operable to receive harvested crops from the harvesting means and to separate crop material therefrom;
cleaning means disposed to receive crop material from the threshing and separating means and to separate clean grain therefrom;
sensing means associated with the cleaning means and operable to sense crop material distribution in the cleaning means and to produce an output signal indicative thereof;
utilization means responsive to the output signal;
sensing means are also disposed transversely of the width of the cleaning sieve and are operable to detect the gradient of the air stream transversely of said sieve which is indicative of the transverse crop material distribution on the sieve; and
the sensing means comprise a plurality of air pressure sensors operable to sense the pressures in the air stream which are indicative for the crop material distribution on the sieve.

10. A combine harvester comprising:
harvesting means for, in use, harvesting crops;
threshing and separating means operable to receive harvested crops from the harvesting means and to separate crop material therefrom;
cleaning means disposed to receive crop material from the threshing and separating means and to separate clean grain therefrom;
sensing means associated with the cleaning means and operable to sense crop material distribution in the cleaning means and to produce an output signal indicative thereof;
utilization means responsive to the output signal; p1 the cleaning means further comprises a cleaning sieve with a plurality of cooperating louvres and a fan means operable to blow a cleaning air stream through adjacent louvres of said cleaning sieve, and wherein sensing means are disposed longitudinally of the length of the cleaning sieve and are operable to detect the gradient of the air stream longitudinally of the sieve which is indicative of the longitudinal crop material distribution on the sieve; and
the sensing means comprise a plurality of directional vanes operable to sense the air pattern in the air stream which is indicative for the crop material distribution on the sieve.

11. A combine harvester comprising:
harvesting means for, in use, harvesting crops;
threshing and separating means operable to receive threshed crops from the harvesting means and to separate crop material therefrom;
cleaning means disposed to receive crop material from the threshing and separating means and to separate clean grain therefrom;
sensing means associated with the cleaning means and operable to sense crop material distribution in the cleaning means and to produce an output signal indicative thereof;
utilization means responsive to the output signal;
sensing means are also disposed transversely of the width of the cleaning sieve and are operable to detect the gradient of the air stream transversely of said sieve which is indicative of the transverse crop material distribution on the sieve; and the sensing means comprise a plurality of directional vanes operable to sense the air pattern in the air stream which is indicative for the crop material distribution on the sieve.

12. A combine harvester comprising:

harvesting means for, in use, harvesting crops;

threshing and separating means operable to receive harvested crops from the harvesting means and to separate crop material therefrom;

cleaning means disposed to receive crop material from the threshing and separating means and to separate clean grain therefrom;

sensing means associated with the cleaning means and operable to sense crop material distribution in the cleaning means and to produce an output signal indicative thereof;

utilization means responsive to the output signal;

the cleaning means further comprises a cleaning sieve with a plurality of cooperating louvres and a fan means operable to blow a cleaning air stream through adjacent louvres of said cleaning sieve, and wherein sensing means are disposed longitudinally of the length of the cleaning sieve and are operable to detect the gradient of the air stream longitudinally of the sieve which is indicative of the longitudinal crop material distribution on the sieve; and the sensing means comprise a plurality of mass detection devices operable to sense the crop material distribution in the cleaing means.

13. A combine harvester comprising:

harvesting means for, in use, harvesting crops;

threshing and separating means operable to receive harvested crops from the harvesting means and to separate crop material therefrom;

cleaning means disposed to receive crop material from the threshing and separating means to separate clean grain therefrom;

sensing means associated with the cleaning means and operable to sense crop material distribution in the cleaning means to produce an output signal indicative thereof;

utilization means responsive to the output signal;

sensing means are also disposed transversely of the width of the cleaning sieve and are operable to detect the gradient of the air stream transversely of said sieve which is indicative of the transverse crop material distribution on the sieve; and the sensing means comprise a plurality of mass detection devices operable to sense the crop material distribution in the cleaing means.

14. A combine harvester comprising:

harvesting means for, in use, harvesting crops;

threshing and separating means operable to receive harvested crops from the harvesting means and to separate crop material therefrom;

cleaning means disposed to receive crop material from the threshing and separating means and to separate clean grain therefrom;

sensing means associated with the cleaning means and operable to sense crop material distibution in the cleaning means and to produce an output signal indicative thereof;

utilization means responsive to the output signal;

the cleaning means further comprises a cleaning sieve with a plurality of cooperating louvres and a fan means operable to blow a cleaning air stream through adjacent louvres of said cleaning sieve, and wherein sensing means are disposed longitudinally of the length of the cleaning sieve and are operable to detect the gradient of the air stream longitudinally of the sieve which is indicative of the longitudinal crop material distribution on the sieve; and the sensing means comprise a plurality of temperature sensitive devices disposed in the air stream through the sieve and operable to detect the magnitude of the air blasts which are indicative for the crop material distribution on the sieve.

15. A combine harvester comprising:

harvesting means for, in use, harvesting crops;

threshing and separating means operable to receive harvested crops from the harvesting means and to separate crop material therefrom;

cleaning means disposed to receive crop material from the threshing and separating means and to separate clean grain therefrom;

sensing means associated with the cleaning means and operable to sense crop material distribution in the cleaning means and to produce an output signal indicative thereof;

utilization means responsive to the output signal;

sensing means are also disposed transversely of the width of the cleaning sieve and are operable to detect the gradient of the air stream transversely of said sieve which is indicative of the transverse crop material distribution on the sieve; and the sensing means comprise a plurality of temperature sensitive devices disposed in the air stream through the sieve and operable to detect the magnitude of the air blasts which are indicative for the crop material distribution on the sieve.

16. A combine harvester comprising:

harvesting means for, in use, harvesting crops;

threshing and separating means operable to receive harvested crops from the harvesting means and to separate crop material therefrom;

cleaning means disposed to receive crop material from the threshing and separating means and to separate clean grain therefrom;

sensing means associated with the cleaning means and operable to sense crop material distribution in the cleaning means and to produce an output signal indicative thereof;

utilization means responsive to the output signal;

the cleaning means further comprises a cleaning sieve with a plurality of cooperating louvres and a fan means operable to blow a cleaning air stream through adjacent louvres of said cleaning sieve, and wherein sensing means are disposed longitudinally of the length of the cleaning sieve and are operable to detect the gradient of the air stream longitudinally of the sieve which is indicative of the longitudinal crop material distribution on the sieve;

the sensing means comprise a plurality of temperature sensitive devices disposed in the air stream through the sieve and operable to detect the magnitude of the air blasts which are indicative for the crop material distribution on the sieve; and the temperature sensitive devices are in the form of hot-wire devices.

17. A combine harvester comprising:

harvesting means for, in use, harvesting crops;

threshing and separating means operable to receive harvested crops from the harvesting means and to separate crop material therefrom;

cleaning means disposed to receive crop material from the threshing and separating means and to separate clean grain therefrom;

sensing means associated with the cleaning means and operable to sense crop material distribution in the cleaning means and to produce an output signal indicative thereof;

utilization means responsive to the output signal;

sensing means are also disposed transversely of the width of the cleaning sieve and are operable to detect the gradient of the air stream transversely of said sieve which is indicative of the transverse crop material distribution on the sieve;

the sensing means comprise a plurality of temperature sensitive devices disposed in the air stream through the sieve and operable to detect the magnitude of the air blasts which are indicative for the crop material distribution on the sieve; and the temperature sensitive devices are in the form of hot-wire devices.

18. A combine harvester comprising:

harvesting means for, in use, harvesting crops;

threshing and separating means operable to receive harvested crops from the harvesting means and to separate crop material therefrom;

cleaning means disposed to receive crop material from the threshing and separating means and to separate clean grain therefrom;

sensing means associated with the cleaning means and operable to sense crop material distribution in the cleaning means and to produce an output signal indicative thereof;

utilization means responsive to the output signal;

the cleaning means further comprises a cleaning sieve with a plurality of cooperating louvres and a fan means operable to blow a cleaning air stream through adjacent louvres of said cleaning sieve, and wherein sensing means are disposed longitudinally of the length of the cleaning sieve and are operable to detect the gradient of the air stream longitudinally of the sieve which is indicative of the longitudinal crop material distribution on the sieve;

the sensing means comprise a plurality of temperature sensitive devices disposed in the air stream through the sieve and operable to detect the magnitude of the air blasts which are indicative for the crop material distribution on the sieve; and the temperature sensitive devices are in the form of thermistors.

19. A combine harvester comprising:

harvesting means for, in use, harvesting crops;

threshing and separating means operable to receive harvested crops from the harvesting means and to separate crop material therefrom;

cleaning means disposed to receive crop material from the threshing and separating means and to separate clean grain therefrom;

sensing means associated with the cleaning means and operable to sense crop material distribution in the cleaning means and to produce an output signal indicative thereof;

utilization means responsive to the output signal;

sensing means are also disposed transversely of the width of the cleaning sieve and are operable to detect the gradient of the air stream transversely of said sieve which is indicative of the transverse crop material distribution on the sieve;

the temperature sensitive devices are in the form of thermistors.

20. A combine harvester comprising:

harvesting means for, in use, harvesting crops;

threshing and separating means operable to receive harvested crops from the harvesting means and to separate crop material therefrom;

cleaning means disposed to receive crop material from the threshing and separating means and to separate clean grain therefrom;

sensing means associated with the cleaning means and operable to sense crop material distribution in the cleaning means and to produce an output signal indicative thereof;

utilization means responsive to the output signal;

the cleaning means further comprises a cleaning sieve with a plurality of cooperating louvres and a fan means operable to blow a cleaning air stream through adjacent louvres of said cleaning sieve, and wherein sensing means are disposed longitudinally of the length of the cleaning sieve and are operable to detect the gradient of the air stream longitudinally of the sieve which is indicative of the longitudinal crop material distribution on the sieve;

the sensing means comprise a plurality of temperature sensitive devices disposed in the air stream through the sieve and operable to detect the magnitude of the air blasts which are indicative for the crop material distribution on the sieve;

the temperature sensitive devices are in the form of thermistors; and each thermistor is disposed on the underside of a louvre of the cleaning sieve at a position in which it is shielded from contact with grain falling through the sieve.

21. A combine harvester comprising:

harvesting means for, in use, harvesting crops;

threshing and separating means operable to receive harvested crops from the harvesting means and to separate crop material therefrom;

cleaning means disposed to receive crop material from the threshing and separating means and to separate clean grain therefrom;

sensing means associated with the cleaning means and operable to sense crop material distribution in the cleaning means and to produce an output signal indicative thereof;

utilization means responsive to the output signal;

sensing means are also disposed transversely of the width of the cleaning sieve and are operable to detect the gradient of the air stream transversely of said sieve which is indicative of the transverse crop material distribution on the sieve;

the sensing means comprise a plurality of temperature sensitive devices disposed in the air stream through the sieve and operable to detect the magnitude of the air blasts which are indicative for the crop material distribution on the sieve;

the temperature sensitive devices are in the form of thermistors; and each thermistor is disposed on the underside of a louvre of the cleaning sieve at a position in which it is shielded from contact with grain falling through the sieve.

22. A combine harvester comprising:
harvesting means for, in use, harvesting crops; threshing and separating means operable to receive harvested crops from the harvesting means and to separate crop material therefrom;
cleaning means disposed to receive crop material from the threshing and separating means and to separate clean grain therefrom;
sensing means associated with the cleaning means and operable to sense crop material distribution in the cleaning means and to produce an output signal indicative thereof;
utilization means responsive to the output signal;
the cleaning means further comprises a cleaning sieve with a plurality of cooperating louvres and a fan means operable to blow a cleaning air stream through adjacent louvres of said cleaning sieve, and wherein sensing means are disposed longitudinally of the length of the cleaning sieve and are operable to detect the gradient of the air stream longitudinally of the sieve which is indicative of the longitudinal crop material distribution on the sieve;
the sensing means comprise a plurality of temperature sensitive devices disposed in the air stream through the sieve and operable to detect the magnitude of the air blasts which are indicative for the crop material distribution on the sieve;
the temperature sensitive devices are in the form of thermistors;
each thermistor is disposed on the underside of a louvre of the cleaning sieve at a position in which it is shielded from contact with grain falling through the sieve; and
the louvres of the cleaning sieve are adjustable about transverse pivots and wherein the louvres to which the thermistors are attached comprise tubular members having their longitudinal axes coincident with the louvre pivot axes; the sensing means also comprising electrical connections for the thermistors, said electrical connections being taken through the tubular members.

23. A combine harvester comprising:
harvesting means for, in use, harvesting crops;
threshing and separating means operable to receive harvested crops from the harvesting means and to separate crop material therefrom;
cleaning means disposed to receive crop material from the threshing and separating means and to separate clean grain therefrom;
sensing means associated with the cleaning means and operable to sense crop material distribution in the cleaning means and to produce an output signal indicative thereof;
utilization means responsive to the output signal;
sensing means are also disposed transversely of the width of the cleaning sieve and are operable to detect the gradient of the air stream transversely of said sieve which is indicative of the transverse crop material distribution on the sieve;
the sensing means comprise a plurality of temperature sensitive devices disposed in the air stream through the sieve and operable to detect the magnitude of the air blasts which are indicative for the crop material distribution on the sieve;
the temperature sensitive devices are in the form of thermistors;
each thermistor is disposed on the underside of a louvre of the cleaning sieve at a position in which it is shielded from contact with grain falling through the sieve; and
the louvres of the cleaning sieve are adjustable about transverse pivots and wherein the louvres to which the thermistors are attached comprise tubular members having their longitudinal axes coincident with the louvre pivot axes; the sensing means also comprising electrical connections for the thermistors, said electrical connections being taken through the tubular members.

24. A combine harvester comprising:
harvesting means for, in use, harvesting crops;
threshing and separating means operable to receive harvested crops from the harvesting means and to separate crop material therefrom;
cleaning means disposed to receive crop material from the threshing and separating means and to separate clean grain therefrom;
sensing means associated with the cleaning means and operable to sense crop material distribution in the cleaning means and to produce an output signal indicative thereof;
utilization means responsive to the output signal;
the cleaning means further comprises a cleaning sieve with a plurality of cooperating louvres and a fan means operable to blow a cleaning air stream through adjacent louvres of said cleaning sieve, and wherein sensing means are disposed longitudinally of the length of the cleaning sieve and are operable to detect the gradient of the air stream longitudinally of the sieve which is indicative of the longitudinal crop material distribution on the sieve;
the sensing means comprise a plurality of temperature sensitive devices disposed in the air stream through the sieve and operable to detect the magnitude of the air blasts which are indicative for the crop material distribution on the sieve;
the temperature sensitve devices are in the form of thermistors;
each thermistor is disposed on the underside of a louvre of the cleaning sieve at a position in which it is shielded from contact with grain falling through the sieve;
the louvres of the cleaning sieve are adjustable about transverse pivots and wherein the louvres to which the thermistors are attached comprise tubular members having their longitudinal axes coincident with the louvre pivot axes; the sensing means also comprising electrical connections for the thermistors, said electrical connections being taken through the tubular members; and
adjusting means connected to the tubular members for adjusting the angular position of the louvres fitted with thermistors.

25. A combine harvester comprising:
harvesting means for, in use, harvesting crops;
threshing and separating means operable to receive harvested crops from the harvesting means and to separate crop material therefrom;
cleaning means disposed to receive crop material from the threshing and separating means and to separate clean grain therefrom;
sensing means associated with the cleaning means and operable to sense crop material distribution in the cleaning means and to produce an output signal indicative thereof;

utilization means responsive to the output signal;

sensing means are also disposed transversely of the width of the cleaning sieve and are operable to detect the gradient of the air stream transversely of said sieve which is indicative of the transverse crop material distribution on the sieve;

the sensing means comprise a plurality of temperature sensitive devices disposed in the air stream through the sieve and operable to detect the megnitude of the air blasts which are indicative for the crop material distribution on the sieve;

the temperature sensitive devices are in the form of thermistors;

each thermistor is disposed on the underside of a louvre of the cleaning sieve at a position in which it is shielded from contact with grain falling through the sieve;

the louvres of the cleaning sieve are adjustable about transverse pivots and wherein the louvres to which the thermistors are attached comprise tubular members having their longitudinal axes coincident with the louvre pivot axes; the sensing means also comprising electrical connections for the thermistors, said electrical connections being taken through the tubular members; and adjusting means connected to the tubular members for adjusting the angular position of the louvres fitted with thermistors.

26. A combine harvester comprising:

harvesting means for, in use, harvesting crops;

threshing and separating means operable to receive harvested crop from the harvesting means and to separate crop material therefrom;

cleaning means disposed to receive crop material from the threshing and separating means and to separate clean grain therefrom;

sensing means associated with the cleaning means and operable to sense crop material distribution in the cleaning means and to produce an output signal indicative thereof;

utilization means responsive to the output signals;

the cleaning means further comprises a cleaning sieve with a plurality of cooperating louvres and a fan means operable to blow a cleaning air stream through adjacent louvres of said cleaning sieve, and wherein sensing means are disposed longitudinally of the length of the cleaning sieve and are operable to detect the gradient of the air stream longitudinally of the sieve which is indicative of the longitudinal crop material distribution on the sieve; and the sensing means comprises measuring means for measuring the electrical resistance between adjacent louvres of the cleaning sieve across the crop material positioned above the aperture therebetween; the electrical resistance varying with the amount of crop material present.

27. A combine harvester comprising:

harvesting means for, in use, harvesting crops;

threshing and separating means operable to receive harvested crop from the harvesting means and to separate crop material therefrom;

cleaning means disposed to receive crop material from the threshing and separating means and to separate clean grain therefrom;

sensing means associated with the cleaning means and operable to sense crop material distribution in the cleaning means and to produce an output signal indicative thereof;

utilization means responsive to the output signal;

sensing means are also disposed transversely of the width of the cleaning sieve and are operable to detect the gradient of the air transversely of said sieve which is indicative of the transverse crop material distribution on the sieve; and the sensing means comprises measuring means for measuring the electrical resistance between adjacent louvres of the cleaning sieve across the crop material positioned above the aperture therebetween; the electrical resistance varying with the amount of crop material present.

28. The combine harvester of claim 27 wherein the cleaning means further comprises a grain pan disposed to receive crop material from the threshing and separating means and wherein the sensing means are operable to detect the crop material distribution on the grain pan.

* * * * *